United States Patent [19]

Dumbovic et al.

[11] Patent Number: 4,707,782

[45] Date of Patent: Nov. 17, 1987

[54] METHOD FOR EFFECTING ONE TIMER INTERRUPT FOR MULTIPLE PORT COMMUNICATION

[75] Inventors: Steve Dumbovic, Elmhurst; Mark A. Dempsky, Villa Park, both of Ill.

[73] Assignee: Illinois Tool Works Inc., Chicago, Ill.

[21] Appl. No.: 648,869

[22] Filed: Sep. 7, 1984

[51] Int. Cl.⁴ .......................................... G06F 13/22
[52] U.S. Cl. .................................... 364/200; 370/29; 370/96
[58] Field of Search ... 364/200 MS File, 900 MS File; 370/24, 29, 96

[56] References Cited

U.S. PATENT DOCUMENTS

| | | | |
|---|---|---|---|
| 4,241,398 | 12/1980 | Carll | 364/200 |
| 4,449,202 | 5/1984 | Knapp et al. | 364/200 |
| 4,476,558 | 10/1984 | Arnon | 370/29 |
| 4,547,880 | 10/1985 | De Vita et al. | 370/96 |

Primary Examiner—Raulfe B. Zache
Assistant Examiner—Emily Y. Chan
Attorney, Agent, or Firm—D. D. Mondul; T. W. Buckman

[57] ABSTRACT

A method for effecting full duplex communications through a plurality of ports of a processing apparatus having one timer. Each output and input signal is expressed as a plurality of bit time intervals. The timer is operated to establish cycles of duration equal to the bit time interval with each of the cycles being divided into sub-bits; designating one of the sub-bits within each of the cycles as a transmitting sub-bit and, upon commencement of the transmitting sub-bit, latching the output pins of appropriate ports at a signal level indicating an output signal bit for transmission at such ports and, upon completion of that latching, interrogating all of the ports for presence of an input signal; upon commencement of sub-bits other than a transmitting sub-bit, interrogating all of the ports for presence of input signals; designating sub-bits of a first cycle during which presence of an input signal is detected as initial sub-bits and identifying sub-bits immediately succeeding initial sub-bits as confirming sub-bits on a port-by-port basis; recognizing input signals detected during confirming sub-bits as true input signals and tagging ports at which true input signals are detected as true input ports; after such tagging, effecting selective interrogation of true input ports in subsequent cycles during sub-bits appearing in a sequential order corresponding to the confirming sub-bits in the first cycle, which selective interrogation of each of the true input ports continues until the input signal at respective true input ports ceases.

9 Claims, 7 Drawing Figures

METHOD FOR EFFECTING ONE TIMER INTERRUPT FOR MULTIPLE PORT COMMUNICATION

BACKGROUND OF THE INVENTION

The present invention is directed to a method of employing a processing apparatus in a host device for full duplex communications through a plurality of ports where the processing apparatus has one timer and executes functions in response to a program of instructions.

It is desirable for a communication device to have the capability to send and receive information simultaneously, i.e. to have full duplex communications, from each input/output (access) port of the device. The output of the device can be controlled; however, there is no control exercisable over arrival times of input signals. Prior art devices have utilized microprocessing units, such as an 8051 micro-processor unit, which has two timers and a serial in/serial out port. With such an arrangement one timer is used in conjunction with a UART (Universal Asyncronous Receiver/Transmitter), which UART was dedicated to the serial in/serial out port; the second timer was dedicated to the remaining access port to control its operation.

At present day prices a micro-processor unit of the 8051 type is nearly 2½ times the price of a type 8048/8049 micro-processor unit. The type 8048/8049 micro-processor unit is a cheaper unit because it has a smaller program memory, only one timer and no serial in/serial out port with an associated UART. No prior art devices or methods are know which would enable use of the simpler and less expensive type 8048/8049 MPU (micro-processor unit) to provivde full duplex communicates through each of two access ports.

The present invention provides a method which enables use of a micro-processor unit having one timer and a plurality of access ports for full duplex communications through each of those access ports. Thus, significant cost savings over prior art devices in construction of communication devices can be achieved through use of the present invention.

SUMMARY OF THE INVENTION

The invention is a method of employing a processing apparatus, such as a type 8048/8049 micro-processing unit, having one timer, in a host computing device to achieve full duplex communications through a plurality of ports. The processing apparatus executes functions in response to a program of instructions and the communications occur at a baud rate, which baud rate is expressed as a plurality of bit time intervals. The timer is employed to effect a plurality of interruptions of the program of instructions at a frequency appropriate to establish a plurality of sub-bit time intervals within each of the plurality of bit time intervals, each of which plurality of interruptions establishes commencement of one of the plurality of sub-bit time intervals.

The host device encodes data and queues that data for subsequent transmission in response to a transmission instruction from the processing apparatus, which queued data is indentified for subsequent transmission through predetermined ports of the plurality of ports.

The program of instructions is employed to respond to one interruption of the plurality of interruptions during each of the plurality of bit time intervals by cycling directly to the transmission instruction and effecting transmission of the queued data through the predetermined ports. The program cycles directly to an input checking instruction upon completion of the transmission of the queued data, which input checking instruction effects a polling of each of the plurality of ports for presence of an input signal.

The program of instructions is employed to respond to each of the plurality of interruptions, other than the one interruption which occasions a transmission instruction, by cycling directly to the input checking instruction for effecting polling of each of the plurality of ports for presence of an input signal.

The program of instructions is employed to respond to an initial detection of an input signal during a first bit time interval at a respective port of the plurality of ports by establishing the sub-bit time interval of the plurality of sub-bit time intervals which is concurrently extant with the initial detection as an initial data sub-bit time interval for the respective port at which the initial detection occurs and by establishing the sub-bit time interval of the plurality of sub-bit time intervals which next follows the initial data sub-bit time interval as a confirmed data sub-bit time interval for the respective port.

The program of instructions is employed to respond to a second detection of an input signal during the confirmed data sub-bit time interval for the respective port by recognizing that second detection as a valid input signal for that respective port, by reading that valid input signal for the respective port into the host device, and by continuing to read the valid input signal for the respective port into the host device during bit time intervals of the plurality of bit time intervals occurring subsequent to the first bit time interval within sub-bit time intervals of the plurality of sub-bit time intervals occurring within the subsequent bit time intervals in corresponding sequential order to occurrence of the confirmed data sub-bit time interval within the first bit time interval.

In the preferred embodiment of the invention, each of the bit time intervals contains an equal number of sub-bit time intervals and the interruption which occasions a transmission instruction is the first of the plurality of interruptions to occur within each of the bit time intervals.

It is therefore an object of this invention to provide a method of employing a lower cost processing apparatus having a single timer in a host device for providing full duplex communications through a plurality of ports.

Further objects and features of the present invention will be apparent from the following specification and claims when considered in connection with the accompanying drawings illustrating the preferred embodiment of the invention.

DETAILED DESCRIPTION OF THE DRAWINGS

FIG. 3 (b) illustrates, in schematic form, a series of bit time intervals similar to the series of bit time intervals illustrated in FIG. 3 (a) as time intervals indicated schematically during the first sub-bit time interval of each bit time interval for accomplishment of transmission functions.

FIGS. 3 (c) and (d) illustrate, in schematic form, two incoming signals, displaced slightly in time, each of which signals comprises a start bit and a plurality of information bits.

FIGS. 3 (a), (b), (c) and (d) are represented on a common horizontal axis representing elapsed time.

Figure 4:
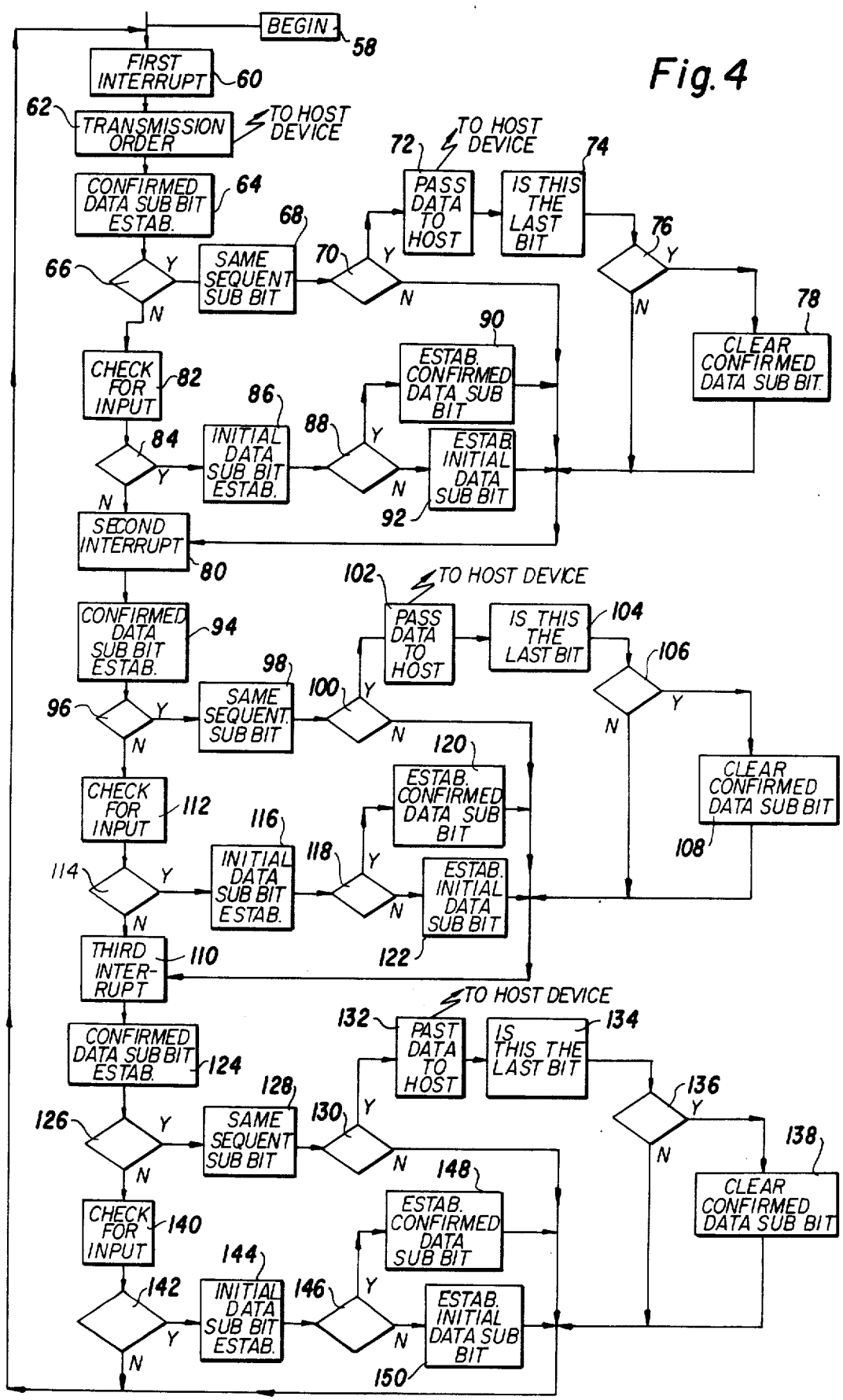

FIG. 4 is a representation of the method of the invention in flow chart form.

DETAILED DESCRIPTION OF THE INVENTION

Figure 1:
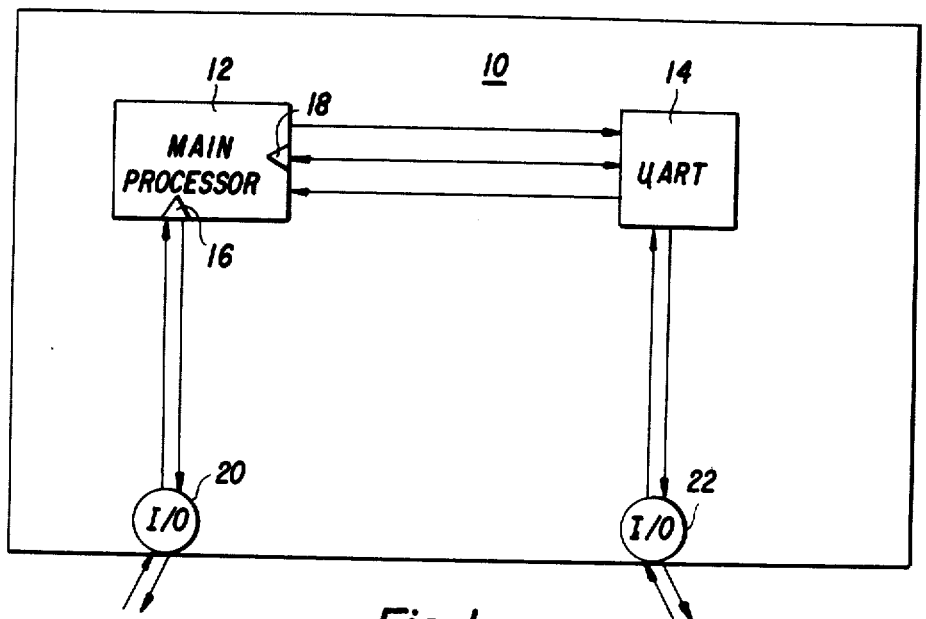
FIG. 1 is a schematic diagram of prior art employment of micro-processing units to provide full duplex communications.

In FIG. 1, a schematic representation of a type 8051 micro-processor device 10 as employed for full duplex communications for multiple ports is illustrated. The 8051 micro-processor device 10 contains a main processor 12 and a universal asycronous receiver/transmitter (UART) 14. The micro-processor unit 10 has incorporated therein two timers: a first timer 16, dedicated to the main processor 12 and a second timer 18 dedicated to the UART. Input/output ports 20 and 22 are operably connected respectively to the main processor 12 and the UART 14.

Each input/output port 20, 22 is operably connected to a peripheral device (not shown), such as a computing-communicating apparatus. The type 8051 micro-processor unit 10 of FIG. 1 operates as follows: the input/output port 20 has dedicated to it the timer 16 and transmissions from the 8051 micro-processor unit 10 or input signals received by the 8051 micro-processor until 10 pass through input/output port 20 as controlled by the timer 16 to the main processor 12 for further transfer to a host device (not shown); output transmissions of the second channel through the input/output port 22 are controlled by the main processor 12 but are routed through the UART 14 en route to the input/output port 22, both for output signal transmission and for input signal processing; the input/output port 22 is controlled by the timer 18.

Figure 2:
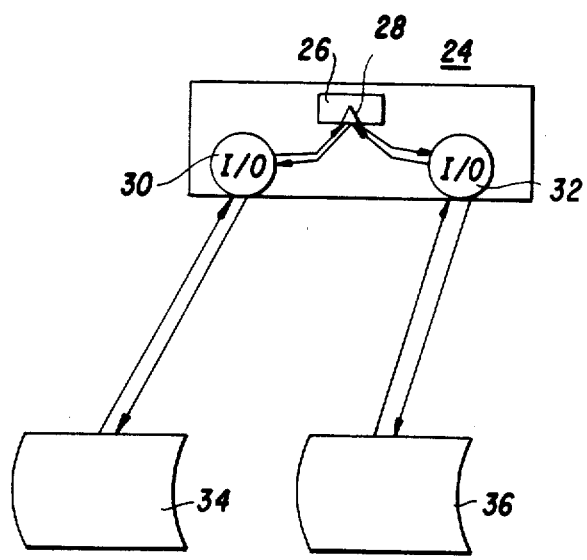
FIG. 2 is a schematic diagram of a micro-processing unit employed in conjunction with the present invention to provide full duplex communications.
Figure 3A:
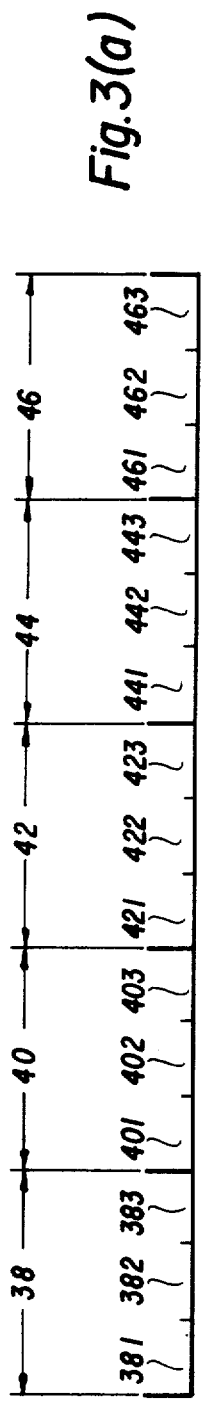
FIG. 3 (a) illustrates, in schematic form, a series of bit time intervals, each of which bit time intervals is segmented into a plurality of sub-bit time intervals.
Figure 3B:
Figure 3C:
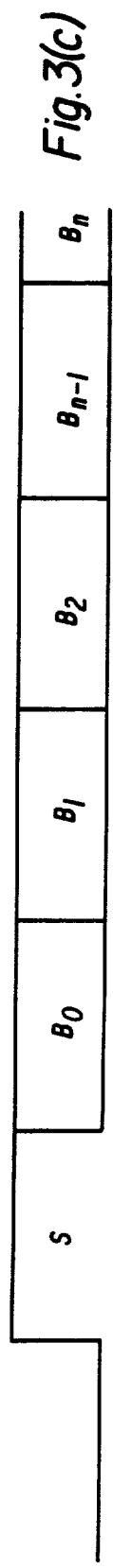
Figure 3D:
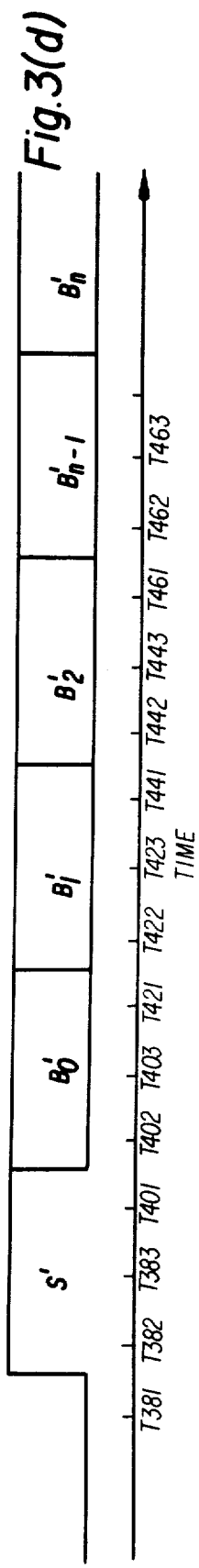

FIG. 2 illustrates, in schematic representation, a type 8048/8049 micro-processor unit 24 having a processing section 26, a single timer 28 and input/output ports 30 and 32. The type 8048/8049 micro-processor unit 24 is schematically illustrated as communicating with peripheral devices 34 and 36. In its communications operations, the type 8048/8049 micro-processor unit 24, through its processing section 25 and its single timer 28, controls transmission of outgoing signals and reception of incoming signals through both input/output ports 30, 32 to effect full duplex communications with peripheral devices 34 and 36 in a manner to be described moee fully hereinafter.

Referring to FIG. 3, it is essential to the understanding of this explanation that each representation contained in FIG. 3 is oriented on a common time scale represented at the bottom of FIG. 3 along a horizontal axis. FIG. 3 (a) represents a series of bits 38, 40, 42, 44 and 46 of specified duration. Each bit is, according to the method of this invention, divided into three sub-bits. In the preferred embodiment, the three sub-bits are of substantially equal duration: for example, bit 38 is divided into sub-bits 381, 382 and 383. Similarly, bit 40 is divided into sub-bits 401, 402 and 403; bit 42 is divided in sub-bits 421, 422 and 423; bit 44 is divided into sub-bits 441, 442 and 443; and bit 46 is divided into sub-bits 461, 462, and 463. The foregoing bit and sub-bit designations shown in FIG. 3 (a) apply to similar time intervals in FIGS. 3(b), (c), and (d).

While the method of the present invention can be employed to divide bits into any number of a plurality of sub-bits, the preferred embodiment of the present invention contemplates dividing bits into three sub-bits of substantially equal duration as described hereinabove. Further pursuant to the method of the present invention, and referring to FIG. 3 (b), one of the plurality of sub-bits in each of the bits is designated a transmission sub-bit. The micro-processing unit which employs the method of the present invention is capable of controlling the times at which transmissions are to occur; the problem addressed by the present invention is inherent in the fact that one cannot control the arrival time of incoming input signals.

Thus, in FIG. 3 (b), the first sub-bit of each of the bits, for example sub-bit 381 of bit 38, is designated a transmitting bit so that the micro-processing unit effects a latching of its output pin at appropriate ports to indicate an output transmission when an output is queued for such transmission by the host device, which latching is at a signal level appropriate to an output signal bit for transmission at the respective port or ports, which output transmitting signal has been queued in a register in the host device (not shown) incorporating the micro-processing unit employing the method of the present invention. Of course, any of the sub-bits within a bit could be designated a transmission sub-bit without degrading the method of the present invention.

In accordance with the preferred embodiment of the present invention, substantially immediately upon completion of the latching of the output pin of the microprocessor unit, the input/output ports 30, 32 (FIG. 2) are polled by the processing section 26 of the microprocessor unit 24 to determine the presence of an input signal. In the example of FIG. 3, FIG. 3 (c) represents an input signal occurring at input/output port 30 and FIG. 3 (d) represents an input signal appearing at input-/output port 32 of FIG. 2.

Thus, as shown in FIG. 3, when the processing section 26 polls input/output port 30 following the completion of the transmission instruction 48, no input signal is detected at input/output port 30 because, as represented at FIG. 3 (c), there is not input signal to be detected. However, when the processing section 26 effects a polling of input/output port 32 during the first sub-bit 381 of bit 38, following completion of the transmission instruction 48, there is an input signal detected, which input signal is the start bit S' of the incoming signal represented by FIG. 3 (d). Therefore, according to the present invention, sub-bit 381 is tagged or designated as an initial data sub-bit with respect to input/output port 32.

Further pursuant to the present invention, substantially immediately followed time 382, which is the commencement point for sub-bit 382 of bit 38, as established by the timer 28 of the micro-processor unit 24, a polling of the input/output ports 30, 32 is effected by the processing section 26. With respect to input/output port 30, as represented by FIG. 3 (c), there is to be detected during sub-bit 382 and input signal, which is the start bit S of the signal represented in FIG. 3 (c). Therefore, with respect to input/output port 30, the processing section 26 establishes sub-bit 382 as an initial data sub-bit. Recalling that sub-bit 381 has previously been designated an initial data sub-bit with respect to input/output port 32, the processing section 26 polls input/output port 32 for presence of an input signal and, upon detecting presence of an input signal (which signal is shown to be present by FIG. 3 (d) in sub-bit 381) establishes sub-bit 382 as a confirming data sub-bit with respect to input/output port 32.

During sub-bit 383, the present invention contemplates the processing section 26 interrogating input/output port 30 for presence of an input signal and, upon detecting presence of an input signal at input/output port 30, establishing sub-bit 383 as a confirming data sub-bit with respect to input/output port 30.

While the transmission instruction 50, 52, 54 and 56 will continue to be effected by the method of the present invention when outputs are queued for transmission by the host device during the initial sub-bits 401, 421, 441 and 461 of their respective bits 40, 42, 44, and 46, the polling of input/output ports 30 and 32 for presence of input signals, once confirming data sub-bits are established at those respective ports, does not occur within every sub-bit.

Recalling that, as represented by FIG. 3 (c), input/output port 30 had had established sub-bit 383 as its confirming data sub-bit, and with respect to input/output port 32 sub-bit 382 had been confirmed as its confirming data sub-bit, according to the present invention interrogation of the respective ports is conducted in subsequent bits during sub-bits appearing in a sequential order corresponding to the order of appearance of confirming sub-bits in the first cycle in which the confirming sub-bits are detected.

Thus, with respect to input/output port 30 (FIG. 3 (c)) interrogation for presence of an input signal will be effected during sub-bits 403, 423, 443 and 463; and interrogation for presence of an input signal at input/output port 32 (FIG. (d)) will be effected during sub-bits 402, 422, 442 and 462. When interrogation of a port yields no input signal presence, then all tags relating to initial data sub-bits and confirming data sub-bits are erased and polling of ports during each sub-bit for presence of input signals recommences until a new input signal is detected, whereupon the method is employed to re-establish initial data sub-bits, confirming data sub-bits, and so on as appropriate.

The arrangement for initial data sub-bits and confirming data sub-bits is particularly important for good reason. If, for example, the actual polling of input/output port 30, as represented by FIG. 3 (c), during sub-bit 382 happens to occur at an instant prior to the commencement of start bit S, then the presence of the input signal at input/output port 30 would be missed even though the input signal did, in fact, commence in sub-bit 382. If such were the case, then the initial data sub-bit for input/output port 30 would be sub-bit 383 and the confirming data sub-bit would be sub-bit 401, with subsequent polling of input/output port 30 occurring in sub-bits 421, 441, and 461.

The time interval occupied by each of the bits of the input signal $S, B_0, B_1, \ldots B_n$ is equal to the time interval occupied by the bits 38, 40, 42, 44 and 46 established by the timer 28 of the micro-processor unit 24. By establishing the confirming data sub-bit as the sequentially ordered bit for subsequent checking for presence of input signals, the method of the present invention ensures a much higher likelihood of a true reading displaced from the start point and the end point of an individual bit. Thus, should a case occur as described above where the commencement of an input signal, such as during sub-bit 382 of FIG. 3 (c), is missed by the polling of the port, the checking in sequentially equal bits to the confirming data sub-bit ensures that a leading edge or a trailing edge of a data bit of an incoming signal will not occur during the subsequent polling sub-bits.

Referring now to FIG. 4, the preferred embodiment of the present invention is shown schematically in flow chart form. Following the beginning of the method 58; which would likely occur on energization of the equipment associated with employment of the method, the timer 28 of the micro-processing unit 24 effects the first interruption 60 which would correspond with time T381 of FIG. 3. A transmission order 62 is issued to the host device when the host device has queued an output for transmission, and in response to that transmission order 62 the transmission instruction 48 (FIG. 3) is executed.

The method then proceeds to a function block 64 by which a check is made as to whether a confirmed data sub-bit has been established. Decision block 66 represents a conditional nature of the further employment of the method of the present invention depending upon whether a confirmed data sub-bit has been established previously. If a confirmed data sub-bit has been established previously, then the method proceeds from the "yes" junction of decision block 66 to inquire whether the sub-bit currently checked, e.g. sub-bit 381 of FIG. 3, is the same sequential sub-bit within its respective bit as was the confirmed data sub-bit within the bit in which it was established. This inquiry is represented by function block 68. If the currently checked sub-bit is the same sequential sub-bit within its respective bit as was the confirmed data sub-bit, then the method proceeds from the "yes" juncture of decision block 70 and by function block 72 the data extant during the currently scanned sub-bit is acquired and passed to the host device.

In the scheme of things in which it is anticipated this method will be employed, the data will be arranged in words, see FIG. 3, which words will consist of a start bit "S" and a plurality of bits $B_0, B_1, \ldots B_n$ with "n" being a known and constant quantity for a given application. Thus, in function block 74 the method inquires whether the currently scanned sub-bit contains the last data bit of a given word, i.e. whether the currently scanned sub-bit contains bit $B_n$ of a word. If the curretly scanned sub-bit yields a last data bit $B_n$ of a word then the method proceeds from the "yes" juncture of decision block 76, the confirmed data sub-bit is cleared from memory by function block 78, and the method proceeds directly to the second interruption 80 to begin looking for a new occurence of a start bit ("S" in FIG. 3).

If the data bit presented in the currently addressed sub-bit is not the last data bit $B_n$ of a word, then the method proceeds from the "no" juncture of decision bloc 76 directly to the second interruption 80.

If the response to the query posed by function block 68 is negative, then the method proceeds from the "no" juncture of decision block 70 directly to the second interruption 80.

If there has been no confirmed data sub-bit established, thereby yielding a negative response to the query posed by function block 64, then the method proceeds from the "no" juncture of decision block 66 and, by function block 82, a query is posed as to whether an input is present at any of the input/output ports 30, 32 within the currently checked sub-bit. If there is an input present during the currently checked sub-bit, the method proceeds from the "yes" juncture of decision block 84 and a query is made as to whether an initial data sub-bit has been established by function block 86.

If an initial data sub-bit has been established, indicating that a start bit has previously been detected, then the method proceeds from the "yes" juncture of decision block 88, a confirmed data sub-bit is established by function block 90, and the method proceeds directly to the second interruption 80.

If an initial data sub-bit has not been established, indicating that a start bit has not been previously detected, then the method proceeds from the "no" juncture of decision block 88, an initial data sub-bit is established by function block 92, and the method proceeds therefrom to the second interruption 80.

If no input is present at the input/output ports 30, 32, then the method proceeds from the "no" juncture of decision block 84 to the second interruption 80.

Following the second interruption 80, which corresponds to time T382, for example in FIG. 3, a query is made by function block 94 as to whether a confirmed data sub-bit has been established. If a confirmed data sub-bit has been established, then the method proceeds from the "yes" juncture of decision block 96 and a query is made by function block 98 as to whether the currently scanned sub-bit appears in the same sequential order within its respective bit as did the confirmed data sub-bit within the bit within which it was detected. If the currently scanned sub-bit is in the same sequential order within its sub-bit as was the confirmed data sub-bit within its respective sub-bit, then the method proceeds from the "yes" juncture of the decision block 100, the data presented within the currently scanned sub-bit is acquired and passed to the host device by function block 102, and inquiry is made by function block 104 whether the currently scanned sub-bit is presenting a last data bit in a word, $B_n$ in FIG. 3.

If the currently presented data bit is the last bit $B_n$ in a word, then the method proceeds from the "yes" juncture of decision block 106, the confirmed data sub-bit is cleared from memory by function block 108, and the method proceeds directly to the third interruption 110. If the currently presented data bit is not the last bit in a word, then the method proceeds from the "no" juncture of decision block 106 directly to the third interruption 110.

If the currently scanned sub-bit does not appear in the same sequential order within its respective bit as did the confirmed data sub-bit within the bit in which it was detected the method proceeds from the "no" juncture of decision block 100 to the third interruption 110.

If the response to function block 94 indicates that no confirmed data sub-bit has been established, then the method proceeds from the "no" juncture of decision block 96 and, by function block 112, the input/output ports 30,32 are checked for presence of an input signal. If an input signal is present at one of the input/output ports 30, 32, then the method proceeds from the "yes" juncture of decision block 114 and, by function block 116, inquiry is made whether an initial data sub-bit has been established previously, indicating that a start bit, "S" (FIG. 3), has been previously detected.

If a start bit "S" has been previously detected, then the method proceeds from the "yes" juncture of decision block 118, by function block 120 the currently checked sub-bit is established as a confirmed data sub-bit and the method proceeds directly to third interruption 110.

If the response to the quiry posed by function block 116 indicates that an initial data sub-bit has not previously been established, i.e. that no start bit has previously been detected, then the method proceeds from the "no" juncture of decision block 118 and, by function block 122, the currently scanned sub-bit is established as an initial data sub-bit and the method proceeds directly to the third interruption 110.

If the response to function block 112 indicates that no input is present during the currently scanned sub-bit, then the method proceeds from the "no" juncture of decision block 114 directly to the third interruption 110.

From the third interruption 110, the method proceeds to function block 124 and inquires whether a confirmed data sub-bit has been previously established. If a confirmed data sub-bit has been previously established, the method proceeds from the "yes" juncture of decision block 126 and a query is made, by function block 128, whether the currently scanned sub-bit appears in the same sequential order within its respective bit as the confirmed data sub-bit appeared within its respective bit.

If the currently scanned sub-bit is sequentially the same as the confirmed data sub-bit was within its respective bit, then the method proceeds from the "yes" juncture of decision block 130, the currently presented data is acquired and passed to the host device by function block 132, and an inquiry is made by function block 134 whether the currently presented data bit is the last bit, $B_n$ (FIG. 3), of a word. If the currently presented data bit is the last data bit $B_n$ of a word, then the method proceeds from the "yes" juncture of decision block 136, the confirmed data sub-bit is cleared from the memory by function block 138, and the method proceeds to the first interruption 60 the next subsequent bit. If the currently presented data bit is not the last data bit, $B_n$, of a word, then the method proceeds from the "no" juncture of decision block 136 directly to the first interruption 60 of the next subsequent bit to be addressed.

If the currently addressed sub-bit is not appearing in the same sequence within its respective bit as did the confirmed data bit within its respective bit, then the method proceeds from the "no" juncture of decision block 130 directly to the first interruption 60 of the next subsequent bit to be addressed.

If the currently scanned sub-bit is not a confirmed data sub-bit, then the method proceeds from the "no" juncture of decision block 126 and, by function block 140, query is made as to whether an input is present at input/output ports 30, 32.

If an input is detected at input/output ports 30, 32, then the method proceeds from the "yes" juncture of decision block 142 and inquiry is made by function block 144 as to whether an initial data sub-bit has previously been established, indicating that a start bit "S" (FIG. 3) has been previously detected.

If an initial data sub-bit has previously been established, then the method proceeds from the "yes" juncture of decision block 146, the currently addressed sub-bit is established as a confirmed data sub-bit by function block 148 and the method proceeds directly to first interruption 60 of the next subsequent bit to be addressed.

If no previous start bit "S" (FIG. 3) has been detected, then a negative response to the query posed by function block 144 is established and the method proceeds from the "no" juncture of decision block 146, the currently addressed sub-bit is established as an initial data sub-bit by function block 150, and the method proceeds to the first interruption 60 of the next subsequent data bit to be addressed.

If not input is detected at input/output ports 30, 32, the method proceeds from the "no" juncture of decision block 142 to the first interruption 60 of the next subsequent bit to be addressed.

It should be noted that FIG. 4 is representative of the method of the present invention as it applies to a single port. Of course, the method can be applied to multiple ports, but a single port representation is employed in FIG. 4 for simplicity of description.

Thus it is that the first interruption 60 in FIG. 4 corresponds, in FIG. 3, to times T381, T401, T421, T441, and T461. Similarly, the second interruption 80 of FIG. 4 corresponds, in FIG. 3, to times T382, T402, T422, T442, and T462. The third interruption 110 of FIG. 4 corresponds, in FIG. 3, to times T383, T403, T423, T443, and T463.

It is to be understood that, while the detailed drawings and specific examples given describe preferred embodiments of the invention, they are for the purpose of illustration only, that the method of the invention is not limited to the precise details and conditions disclosed and that various changes may be made therein without departing from the spirit of the invention which is defined by the following claims.

We claim:

1. A method for employing a processing apparatus in a host device for full duplex communications through a plurality of ports, said processing apparatus having one timer and executing functions in response to a program of instructions, said communications occurring at a baud rate, said baud rate being expressed as a plurality of bit time intervals; the method comprising:

effecting a plurality of interruptions of said program of instructions at a frequency with said timer, said frequency defining a plurality of sub-bit time intervals within each of said plurality of bit time intervals, each of said plurality of interruptions establishing commencement of one of said plurality of sub-bit time intervals;

said host device encoding data and queuing said data, said host device identifying said queued data for subsequent transmission through predetermined ports of said plurality of ports in response to a transmission instruction from said processing apparatus;

employing said program of instructions to respond to one interruption of said plurality of interruptions during each of said plurality of bit time intervals by immediately executing said transmission instruction to said host device, said host device effecting transmission of said queued data through said predetermined ports, said program immediately executing an input checking instruction upon completion of said transmission of said queued data, said input checking instruction causes said host device to poll each of said plurality of ports for presence of an input signal;

employing said program of instructions to respond to each of said plurality of interruptions other than said one interruption by immediately executing said input checking instruction, said input checking instruction causing said host device to poll each of said plurality of ports for presence of an input signal;

employing said program of instructions to respond to an initial detection of an input signal during a first bit time interval at a respective port of said plurality of ports by establishing the sub-bit time interval of said plurality of sub-bit time intervals which is concurrently extant with said initial detection of said respective port as an initial data sub-bit time interval for said respective port and by establishing the sub-bit time interval of said plurality of sub-bit time intervals which next follows said initial data sub-bit time interval as a confirmed data sub-bit time interval for said respective port;

employing said program of instructions to respond to a second detection of an input signal during a confirmed data sub-bit time interval for said respective port by recognizing said second detection as a valid input signal for said respective port, by reading said valid input signal for said respective port into said host device, and by continuing to read said valid input signal for said respective port into said host device during bit time intervals of said plurality of bit time intervals occurring subsequent to said first bit time interval within sub-bit time intervals of said plurality of sub-bit time intervals occurring within said subsequent bit time intervals in corresponding sequential order to occurrence of said confirmed data sub-bit time interval within said first bit time interval.

2. A method of employing a processing apparatus in a host device for full duplex communications through a plurality of ports as recited in claim 1 wherein each of said bit time intervals contains an equal number of said plurality of sub-bit time intervals.

3. A method of employing a processing apparatus in a host device for full duplex communications through a plurality of ports as recited in claim 1 wherein said one of said sub-bit time intervals is the first of said sub-bit time intervals to occur within each of said bit time intervals.

4. A method of employing a processing apparatus in a host device for full duplex communications through a plurality of ports as recited in claim 1 wherein each bit of said input signal is of substantially the same duration of each of said plurality of bit time intervals.

5. A method for effecting communications through a plurality of ports of a processing apparatus having one timer, said communications being full duplex communications expressed in output signals transmitted through an output pin at each of said plurality of ports and input signals received through an input pin at each of said plurality of ports; each of said output signals and each of said input signals being expressed as a plurality of bits, each of said bits occupying a bit time interval; said method comprising:

operating said time to establish cyclic operation of said processing apparatus, said cyclic operation being accomplished in cycles of duration equal to said bit time interval, each of said cycles being divided into a plurality of sub-bits;

designating one of said plurality of sub-bits within each of said cycles as a transmitting sub-bit, upon commencement of said transmitting sub-bit latching said output pins at transmitting ports of said plurality of ports at a signal level respresentative of an output signal bit for transmission at said transmitting ports and, upon completion of said latching, interrogating all of said plurality of ports for presence of said input signals;

upon commencement of sub-bits of said plurality of sub-bits other than said transmitting sub-bit, interogating all of said plurality of ports for presence of said input signals;

designating on a port-by-port basis sub-bits of said plurality of sub-bits of a first cycle during which presence of said input signals are detected as initial sub-bits, and identifying on a port-by-port basis sub-bits of said plurality of sub-bits immediately sequentially succeeding and initial sub-bits as confirming sub-bits;

recognizing input signals detected during said confirming sub-bits as true input signals and tagging ports of said plurality of ports at which said true input signals are detected as true input ports;

after said tagging, selectively interrogating said true input ports in subsequent cycles to said first cycle during sub-bits of said plurality of sub-bits in said subsequent cycles appearing in a sequential order corresponding to said confirming sub-bits in said first cycle, said selective interrogation of each of said true input ports continuing until said input signal at respective true input ports ceases, thereby marking said respective true input ports as regular ports, said regular ports thereafter being interrogated during all sub-bits of said plurality of sub-bits for a subsequent appearance of one of said input signals.

6. A method for effecting communication through a plurality of ports of a processing apparatus having one timer as recited in claim 5 wherein said transmitting sub-bit is the first sub-bit of said plurality of sub-bits to appear in each of said cycles.

7. A method for effecting communication through a plurality of ports of a processing apparatus having one timer as recited in claim 6 wherein said plurality of sub-bits is equal in each of said cycles.

8. A method for effecting communication through a plurality of ports of a processing apparatus having one timer as recited in claim 7 wherein said plurality of sub-bits is three sub-bits.

9. A method for effecting communications through a plurality of ports of a processing apparatus having one timer as recited in claim 8 wherein said plurality of ports is two ports.

* * * * *